(12) United States Patent
Hilleary et al.

(10) Patent No.: US 7,757,765 B2
(45) Date of Patent: Jul. 20, 2010

(54) DOWNHOLE PREPARATION AND USE OF THIXOTROPIC CEMENT SLURRIES

(75) Inventors: Nathan Hilleary, Anchorage, AK (US); Robert Nelson, Houston, TX (US); Robert Bucher, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/946,958

(22) Filed: Nov. 29, 2007

(65) Prior Publication Data

US 2008/0179059 A1 Jul. 31, 2008

Related U.S. Application Data

(60) Provisional application No. 60/886,823, filed on Jan. 26, 2007.

(51) Int. Cl.
*E21B 33/13* (2006.01)
(52) U.S. Cl. .................... 166/292; 166/285; 166/293
(58) Field of Classification Search ........................ None
See application file for complete search history.

(56) References Cited

U.S. PATENT DOCUMENTS

| 2,800,964 | A | * | 7/1957 | Garrick | 166/294 |
|---|---|---|---|---|---|
| 4,441,556 | A | | 4/1984 | Powers | |
| 4,924,942 | A | * | 5/1990 | Shen | 166/291 |
| 5,113,943 | A | | 5/1992 | Wilson | |
| 5,314,022 | A | * | 5/1994 | Cowan et al. | 166/293 |
| 5,327,968 | A | * | 7/1994 | Onan et al. | 166/293 |
| 5,398,758 | A | * | 3/1995 | Onan et al. | 166/292 |
| 6,036,765 | A | * | 3/2000 | Farrow et al. | 106/487 |
| 6,279,655 | B1 | | 8/2001 | Pafitis | |
| 6,475,959 | B1 | | 11/2002 | Lange | |
| 6,610,140 | B2 | | 8/2003 | Vijn | |
| 6,823,939 | B2 | | 11/2004 | Bouwmeester | |
| 2002/0134283 | A1 | | 9/2002 | Vijn | |

* cited by examiner

*Primary Examiner*—Zakiya W Bates
*Assistant Examiner*—Angela M DiTrani
(74) *Attorney, Agent, or Firm*—Martin Rzaniak; David Cate; Robin Nava

(57) ABSTRACT

A method for use within a subterranean formation penetrated by a wellbore includes introducing a thixotropic agent into the well and introducing a cement slurry into the well. The method includes forming a thixotropic cement slurry downhole, including mixing the cement slurry and the thixotropic agent downhole.

14 Claims, 7 Drawing Sheets

DOWNHOLE PREPARATION AND USE OF THIXOTROPIC CEMENT SLURRIES

This application claims the benefit under 35 U.S.C. §119 (e) to U.S. Provisional Patent Application Ser. No. 60/886,823, entitled, "DOWNHOLE PREPARATION OF THIXOTROPIC CEMENT SLURRIES," which was filed on Jan. 26, 2007, and is hereby incorporated by reference in its entirety.

FIELD OF THE INVENTION

The invention generally relates to thixotropic cement slurries, and specifically to downhole preparation of such slurries and methods of use therefore.

BACKGROUND OF THE INVENTION

The statements in this section merely provide background information related to the present disclosure and may not constitute prior art.

Thixotropic materials have the property of being fluid under shear but developing a gel structure and becoming self-supporting when at rest. The process is reversible. Thixotropic cements, which are thin and fluid during mixing and placement but reversibly form a rigid gel structure when pumping ceases, are useful in various subterranean applications, including water wells and hydrocarbon producing wells such as gas or oil wells. Some useful applications of thixotropic cement systems are plugging lost circulation zones during both drilling and cementing operations, repair of damaged or corroded casing, as grouts, and to limit annular gas migration in some situations. Such systems have also been used in situations where weak formations are exposed and would otherwise fracture under the hydrostatic pressure of a cement column; when using a thixotropic cement, the hydrostatic pressure of the column diminishes as the cement gels.

Incorporation of LAPONITE (REGISTERED TRADE MARK—synthetic smectite clay products for water-based applications) into a cement slurry yields a highly thixotropic cement, as described in U.S. Pat. No. 6,279,655, owned by the assignee to this application, and incorporated herein by reference in its entirety. When thixotropic cement is mixed on the surface prior to subterranean use, a highly viscous cement slurry is formed. Pumping such a viscous thixotropic cement slurry from the surface to the target depth is traditionally achieved by the use of pressure pumps to transport the slurry through coiled tubing or through placement conduit, e.g., drillpipe, casing, and the like.

Some issues that can be associated with the conventional pumping techniques for such cement slurries, include: (1) high pumping pressure which can exceed maximum working pressure of surface equipment; (2) loss of thixotropic properties caused by shear stress on the slurry as it is pumped from the surface to the target depth, (3) loss of thixotropy resulting in the cement containing LAPONITE falling back through the slots of a slotted liner or liner leak. The negative consequences associated with this include stuck pipe and poor cement/formation bond in the zone of interest. The phrase "stuck pipe", as used herein, refers to the placement mechanism (e.g. coiled tubing) becoming lodged, or stuck, due to the differential pressure that is caused by the cement reentering the inner liner.

Thus, there is a continuing need for improved ways to deliver and use thixotropic cement slurries in hydrocarbon or water bearing subterranean formations. This invention meets at least some of that need.

SUMMARY OF THE INVENTION

The invention provides methods of forming a cement in a subterranean formation penetrated by a wellbore including the steps of: introducing a thixotropic agent into the well and introducing a cement slurry into the well.

In one embodiment of the invention, a method is provided that includes forming a thixotropic cement slurry downhole, including the step of mixing the cement slurry and the thixotropic agent downhole.

In another embodiment of the invention, a method usable in a subterranean formation penetrated by a wellbore includes forming a boundary layer that is more thixotropic than the cement slurry flow prior to introducing the cement slurry flow in the well.

Yet another embodiment of the invention provides a system that is suitable for use in a subterranean formation includes a downhole tubular member, a cementitious material and a thixotropic boundary layer that is more thixotropic than the cementitious material. The downhole tubular member defines an annular region about the member, and the cementitious material and boundary layer are located in the annular region.

Advantages and other features of the invention will become apparent from the detailed description, drawing and claims.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions used in methods of the invention may be described herein as comprising certain materials, it should be understood that the composition could optionally comprise two or more chemically different materials. In addition, the composition can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Figure 1:
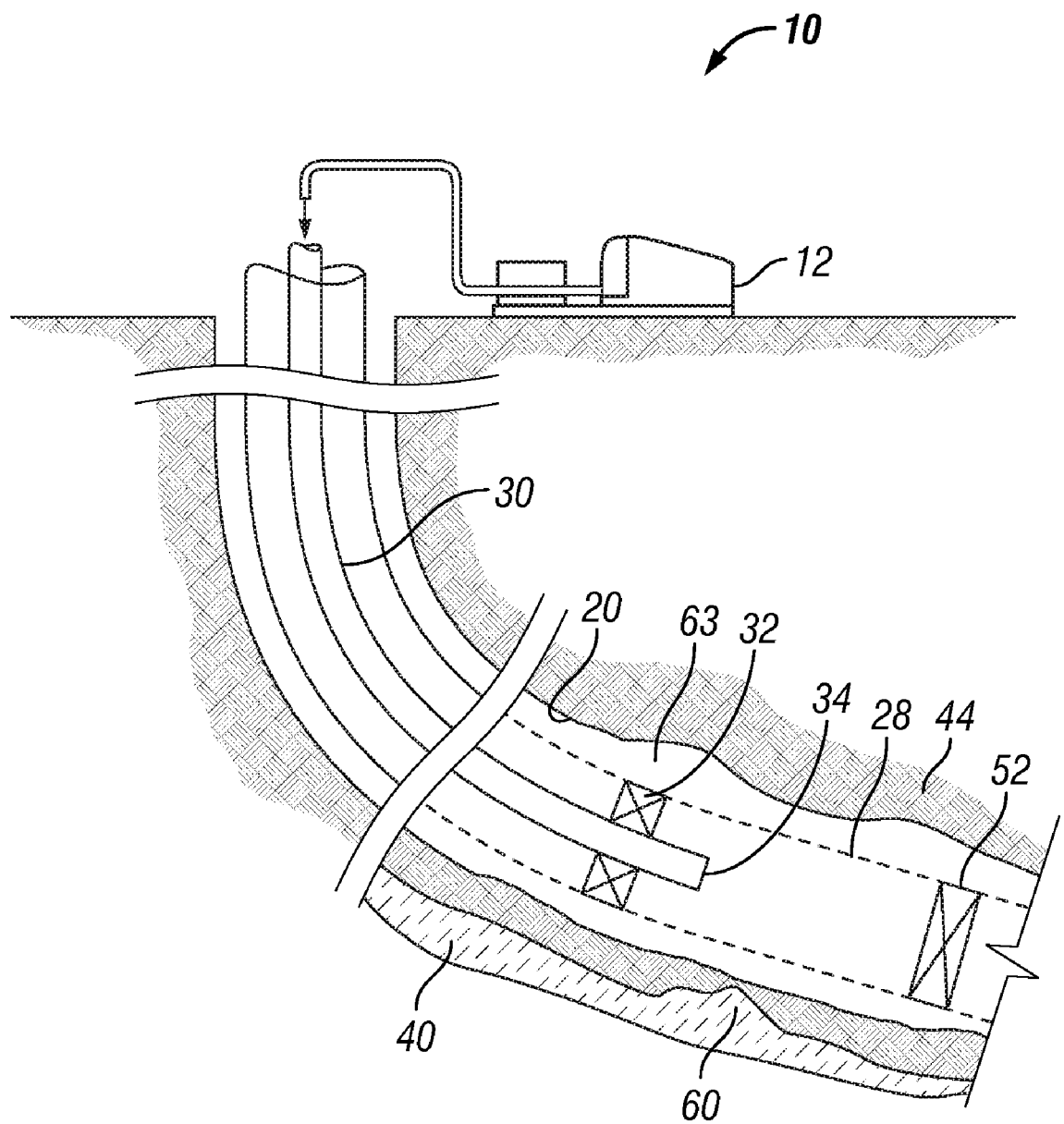
FIGS. 1, 2, 3, 4 and 5 are schematic diagrams of a well illustrating different stages of a well cementing process according to embodiments of the invention.

Referring to FIG. 1, methods and systems are described herein for purposes of preparing a thixotropic cement slurry downhole in a well. More specifically, FIG. 1 depicts an embodiment 10 of a that that may be used to prepare a thixotropic cement slurry inside a wellbore 20 in accordance with embodiments of the invention. The wellbore 20 may be (as an example) a lateral wellbore that extends through a particular formation 44. As shown at reference numeral 60, the wellbore 20 may intersect a water layer 40; and thus, it may be desirable to place cement in an annular region (herein called the "zone of interest 63") that surrounds a slotted liner 28 near where water is being produced into the liner 28. For this purpose, FIG. 1 depicts the use of a tubular string 30 (a coiled tubing string, for example), which extends downhole into the wellbore 20 and is positioned so that its lower end 34 is in proximity to the zone of interest 62. The string 30 is used to deliver a cement slurry and a thixotropic agent downhole through its central passageway. As described below, the cement slurry and thixotropic agent mix downhole for purposes of preparing a thixotropic cement slurry that forms a boundary layer that enhances the cementing operation.

It is noted that the system 10 as depicted in FIG. 1 is merely illustrative, i.e., other systems are also contemplated for the downhole preparation of a thixotropic cement slurry.

Referring again to FIG. 1, the string 30 includes an annular packer 32 that, (when set as shown in FIG. 1), forms an annular seal between the exterior surface of the string 30 and the interior surface of the slotted liner 28. Thus, for the state of the packer 32 depicted in FIG. 1, communication uphole is prevented between the liner 28 and string 30. As also shown in FIG. 1, initial state, a plug, such as a bridge plug 52, may be placed downhole of the end 34 of the string 30 to seal off the central passageway of the slotted liner 28.

As further described below, for purposes of preparing the thixotropic cement slurry downhole in the well, a surface pumping system 12, as further described below, communicates a reactive gel, a non-reactive gel and a cement slurry downhole through the central passageway of the string 30.

In accordance with embodiments of the invention described herein, one method of preparation of the thixotropic cement slurry downhole in the well involves delivering a thixotropic cement slurry to the zone of interest 63 by first delivering the thixotropic agent downhole via a reactive gel and mixing, downhole, the reactive gel with the cement slurry. In these embodiments, a thixotropic cement slurry is delivered to a zone of interest and may be capable of rapidly gelling, either reversibly or irreversibly. Some of the advantages provided by such a method include reduction of pumping pressures because a thixotropic system has not been formed by a pumping stage on the surface, and thus there is no shear stress on the thixotropic system ultimately formed by pumping at high pressures, and the system will reliably provide the required thixotropic properties at the target zone. Because the thixotropic cement slurry is prepared downhole at or near the zone of interest, the shear stress that occurs when thixotropic slurry is mixed and transported from the surface is substantially reduced or eliminated, thus the thixotropy properties of the mixture of thixotrope and cement are not endangered. This may significantly eliminate or prevent the cement slurry from falling back inside the liner, casing, or pipe due to loss of thixotropy, depending on the particular embodiment of the invention.

Thixotropy is the property of some non-newtonian pseudoplastic fluids to show a time-dependent change in viscosity; for example, the longer the fluid undergoes shear, the lower its viscosity. A thixotropic fluid is a shear-thinning fluid which takes a finite amount of time to reach an equilibrium viscosity when introduced to a step change in shear rate. However, this is not a universal definition; the term is sometimes applied to pseudoplastic fluids without a viscosity/time component. Many gels and colloids are thixotropic materials, exhibiting a stable form at rest but becoming fluid when agitated. Examples of such materials include modern alkyd and latex paint varieties that will not run off the painter's brush, but will still spread easily and evenly, since the gel-like paint "liquefies" when brushed out. Dishwashing soaps in fluid form are generally thixotropic as are some condiments, including ketchup. Many clutch-type automatic transmissions employ thixotropic fluids to engage the different clutch plates inside the transmission housing at specific pressures, which then changes the gear set. Some clays or silicates are also thixotropic, such behavior is of importance to structural and geotechnical engineers. In earthquake zones, clay-like ground can exhibit characteristics of liquefaction under the shaking of a tremor, having extreme effects on earth structures and buildings.

Any suitable thixotropes which impart thixotropic properties to the cementing slurry composition while maintaining the ability to control the setting time and physical integrity of the setting slurry over a broad range may be used, in accordance with embodiments of the invention. The thixotrope may be selected from a number of known thixotropic substances, particularly strongly interacting particulate and molecular species. In the first case, the thixotrope conveniently comprises a fine grained (having a mean particle size with maximum dimension of less than 1 micron) inorganic colloid, particularly fine grained clays, especially smectite clays, e.g. hectorites. Many thixotropes are described in U.S. Pat. No. 6,279,655, incorporated herein by reference. Some examples of suitable thixotropes are attapulgite, fumed silica, micas, bentonites, organoclays, castor based thixotropes, polyamides, polethylenes, sepiolite, and the like. One useful example of a thixotropic fluid, or thixotrope, is Laponite, which is an aqueous mixture of water and synthetic clay, a synthetic trioctahedral smectites similar to the natural clay hectorite. The synthetic claims are commercially available in various modifications under the trade name LAPONITE (REGISTERED TRADE MARK—synthetic smectite clay products for water-based applications) (Southern Clay Products, Inc.), LAPONITE RD, LAPONITE D, LAPONITE DF, LAPONITE RDS, LAPONITE XLG, LAPONITE XLS, LAPONITE S, LAPONITE JS all of which are layered hydrous sodium lithium magnesium silicates, some being modified with tetrasodiumpyrophosphate.

Other strongly interacting colloids such as latexes and other materials, e.g. as used in the paint industry and the pharmaceutical industry, may also be useful for this purpose. Similarly, mixed metal hydroxides may be useful. Associative polymers and self-assembling surfactant systems may also act as suitable thixotropes. Appropriate mixtures of thixotropes may be used as well.

The cement, which includes any suitable settable material and may also be generally referred to herein as a settable material, may be selected from a range of known settable materials, including but not limited to the following: cementitious materials, e.g. cements, particularly Portland cements, blast furnace slag, fly ash/lime mixes and mixtures of these materials; other ceramic-forming materials; and polymeric materials, e.g. thermosetting polymers and the like.

Appropriate mixtures of settable materials may also be used. The thixotropes and settable materials should be selected to be compatible with each other, in a known manner. The materials described herein generally have a sufficiently low viscosity so as to be readily pumpable. Additionally, the materials that are delivered to the wellbore may be mixable in standard oilfield cement mixing equipment.

The mixtures described herein may include other compatible ingredients, such as additives conventionally used in oilfield cements. Where the settable material includes cement, a cement retarder may generally be included. Suitable retarders are known to those skilled in the art and include, for example, the sodium or calcium salts of lignosulphonic acids. Further, a surfactant may be included to act as a dispersant and/or cement retarder. Anti-foaming agents may also be included. Depending on the intended use of the material, other materials may be included as fillers. Other conventional additives may also be included provided they do not interfere with the gel forming properties of the material.

The term "rapid" is used in the context of gelling to mean that a material gels in a gelling time of less than 180 seconds, preferably less than 120 seconds, more preferably less than 60 seconds, or even less than 30 seconds, less than 15 seconds, or even less than 10 seconds. The thixotrope containing cementing slurries may include any suitable gel, e.g., a gel having a shear yield stress of at least 10 lbs force per 100 $ft^2$ as determined at surface conditions, and possibly up to 96 lbs force per 100 $ft^2$ Pa or more. The material preferably reaches substantially its maximum gel strength (i.e., at least about 90% of the maximum value) within the gelling time, and maintains this value (i.e., staying within about 20% of this value) for an extended period of time (i.e., at least about 2 hours).

The setting time for the thixotropic cement material is substantially longer than the gelling time. Typical setting times are at least about 2 hours and possibly up to about 4 hours or more. Thus, if material flow stops, even for an extended time, it will still be possible to resume pumping. The gel is preferably reversible until setting has occurred.

The gelling time and the setting time of the thixotropic cement materials are preferably separately controllable so that it is possible to produce a material having desired combinations of gelling and setting times, e.g. a fast gelling/slow setting material, a fast gelling/fast setting material etc. The setting time is typically controlled by use of retarders in a manner known to those skilled in the art. The properties of the thixotropic cement material when set, including strength, porosity, interfacial bonding to rock and steel/plastics, can be tailored to suit the intended use of the material.

The thixotropic cement material preferably has the characteristics and performance specified above under down-hole conditions. These typically include temperatures in the range 50 to 150° C. and possibly higher, and pressures of up to 1000 bar and possibly higher. The material should also be able to cope with environmental factors such as the variable and sometimes high salinity and hardness of wellbore fluids, and the presence of hydrocarbons and particulate matter.

Good results have been obtained with mixtures of Laponite and Portland cement, particularly of classes A and G. These cements are predominantly calcium oxide and silicon dioxide with minor amounts of iron oxide, aluminum oxide, sulphur trioxide and other trace level compounds. The chemical compounds included in the set anhydrous cements include tricalcium aluminate, dicalcium silicate and tetracalcium aluminoferrite. Typical compositions comprise from about 3 to about 6% LAPONITE RDS by weight of water, with a water/cement ratio of about 50%.

The thixotropic materials described herein find use generally in subterranean applications, including those mentioned above. These materials find particular application in methods for completion of horizontal wells completed with slotted or predrilled liners, as described in U.S. Pat. No. 5,697,441, incorporated herein by reference. Thus, in accordance with embodiments of the methods described herein, a plug may be set as follows. First, a pair of packers are placed inside a liner where the plug is to be positioned, the packers being spaced apart so as to define both a chamber inside the liner which includes a perforation and also a region to be plugged outside the liner. Predetermined volumes of the cement slurry and the reactive gel containing a thixotrope are introduced into the chamber and then via the perforation, passes into the region to be plugged. Sufficient and predetermined volumes of the material are used in order to displace substantially all other fluids from the region to be plugged.

Methods described herein may also be used for purposes of forming a plug in a region of the well in which a volume of settable thixotropic material is prepared near the region. For example, the plug may be introduced using a packer apparatus, such as a pair of region-delimiting packers, which define the region to be plugged. The volume of settable thixotropic material is sufficient to displace substantially all of the fluids from the region to be plugged.

In another aspect, the methods that are described herein may be used to submit a casing or pipe in a borehole. The methods include preparing a thixotropic cement material within the annular space between the outer surface of the casing or pipe and the wall of the borehole.

In some embodiments of the invention, a crosslinked gel carrying LAPONITE to transport LAPONITE into the zone of interest. This gel (or any other gel that results in a thixotropic reaction on contact with cement) is referred to as "reactive gel". The term "Non-reactive gel" is used hereafter to refer to as a crosslinked gel that does not contain LAPONITE or an equivalent. A packer (or other sealing type assembly) is used to isolate the zone of interest at the inner liner/casing/tubing and pressure is applied from the surface to squeeze the reactive gel from the inside of the slotted liner/casing/tubing into the zone of interest. The reactive gel has sufficient thixotropy to prevent any significant falling back from the zone of interest into the inside of the slotted liner/casing/tubing.

Figure 2:
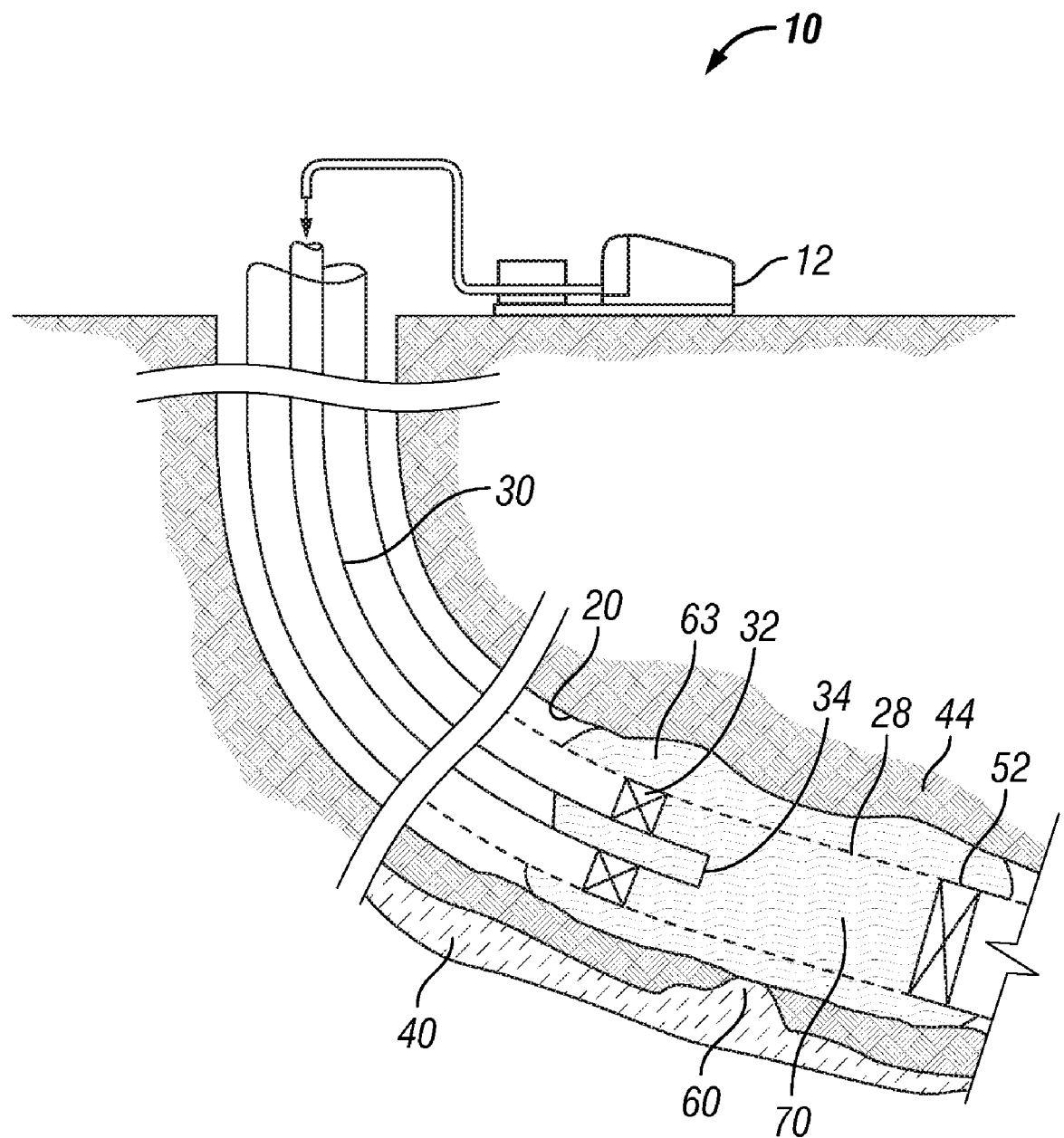

The above-described aspects of the downhole thixotropic cement slurry preparation are further below described in connection with the system 10. More specifically, given the initial set up depicted in FIG. 1, a reactive gel 70 may be pumped through the central passageway of the string 30 and exit the string 30 at its lower end 34, as depicted in FIG. 2. Due to the pumping, the reactive gel 70 is squeezed from the interior space of the slotted liner 28 through slots in the sidewall of the liner 28 into the zone of interest. The reactive gel 70 has sufficient thixotropy to prevent the gel 70 from re-entering the interior space of the liner 28. Thus, as shown in FIG. 2, for this stage, the reactive gel 70 is present in the zone of interest 63 outside of the slotted liner 28, inside the liner 28 and partially inside the central passageway of the string 30.

As an example, the reactive gel 70 may include a crosslinked gel and LAPONITE RDS. An 80 pound gel was created in the example from a 40% by weight aqueous solution of hydroxyethylcellulose (HEC) crosslinked with polyacrylamide emulsion. The reactive gel was created by adding LAPONITE RDS at 15% weight of water to 500 grams of water. The LAPONITE RDS was allowed to hydrate for 30 minutes. The hydrated LAPONITE RDS was stirred in a Waring Blender, and the 80 pound gel was created by adding 12 mL of hydroxyethylcellulose. The gel was then crosslinked by adding 2 mL of polyacrylamide emulsion to the mixture. The LAPONIITE/HEC/polyacrylamide gel is placed by squeezing cement into the annulus. An adjustable packer or sealing system is used to isolate the inner liner at the zone of interest and squeeze reactive gel into the annulus. The reactive gel is thixotropic enough to hold and remain in the annulus, has low friction pressure (pumpable through coiled tubing), and contains LAPONITE to react with the cementitious system.

Figure 3:
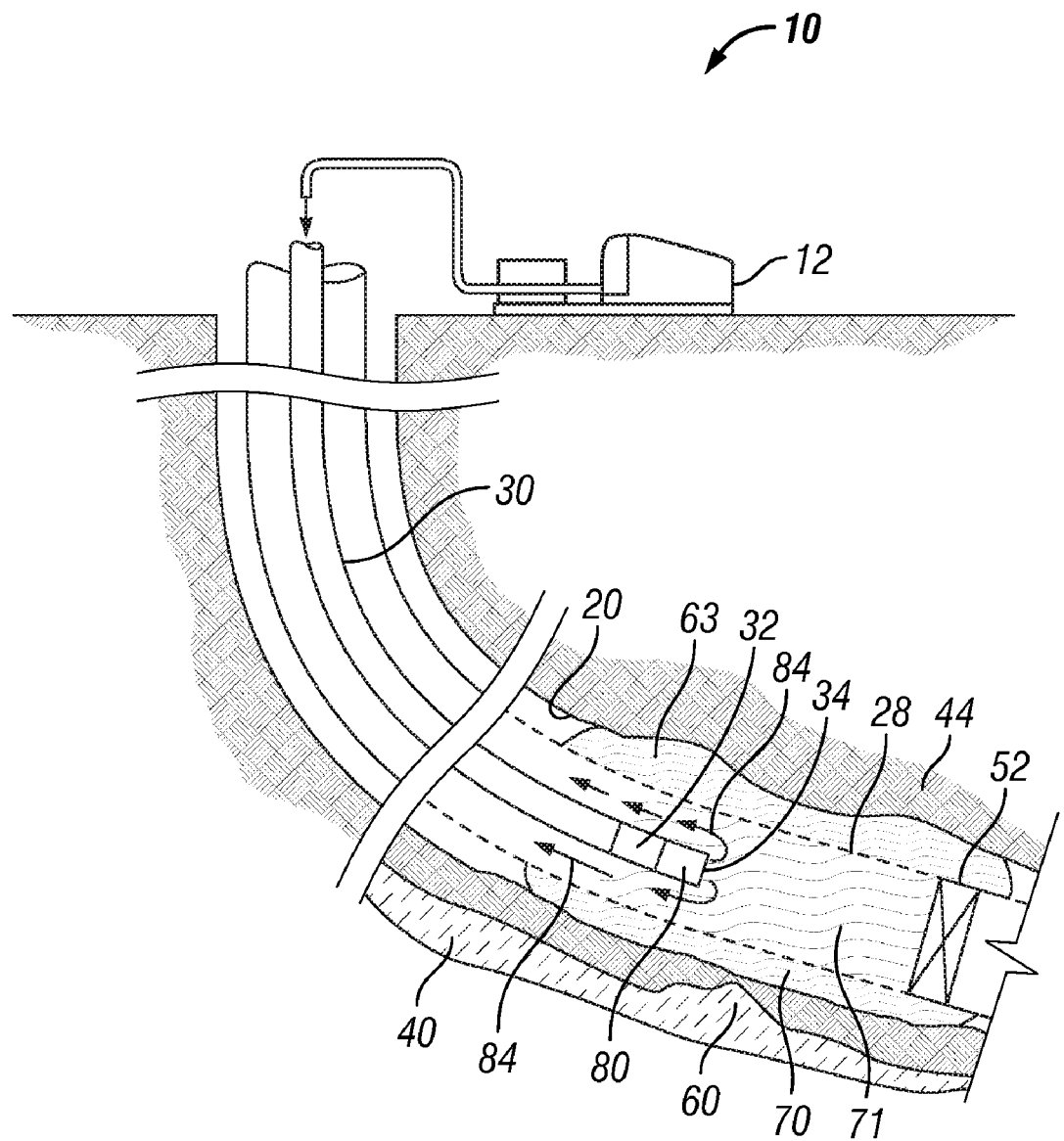

FIG. 3 depicts the next stage in which the reactive gel 70 is cleaned out from inside the slotted liner 28 so that the gel 70 remains in the zone of interest 63. For this stage, the packer 32 (see FIG. 2) is unset, or released, to allow an annular flow path between the string 30 and the inside of the liner 28. A non-reactive gel 71 is pumped through a jetting device 80 located at the end of the string 30, as shown by the flow 84. The non-reactive gel 71 carries the reactive gel 70 away from the interior space of the liner 28 and back up the wellbore 20. The string 30 is moved in a reciprocating action back and forth to minimize the injection of the non-reactive gel 71 into the zone of interest 63. The result is that the reactive gel 70 accumulates in the annulus in the zone of interest 63, and the non-reactive gel 71 accumulates inside the liner 28.

As an example, the non-reactive gel may be 500 mL water, 12 mL of 40% by weight HEC in water and 2 mL polyacrylamide emulsion) and this non-reactive gel may be communicated into the liner 28 by various means, for example, through a jetting nozzle.

Figure 4:
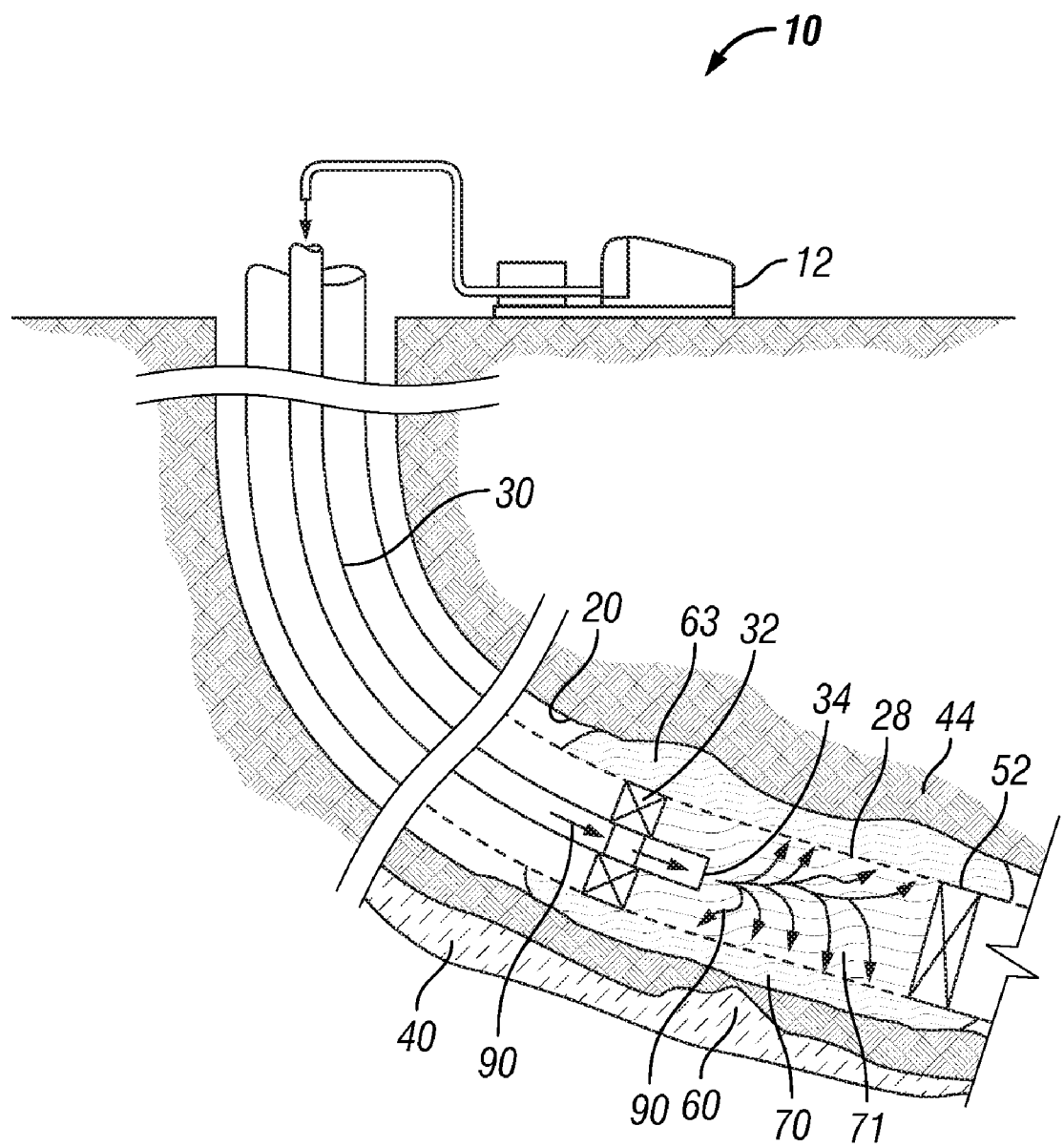

Referring to FIG. 4, in the next stage, the packer 32 is once again set to block off uphole annular communication between the string 30 and the slotted liner 28. In this stage, a cement slurry (indicated by flow 90) is pumped downhole through the string 30 and exits the string 30 at its lower end 34 into the interior space of the slotted liner 28. The cement slurry may contain, as an example, 15.8 ppg Class G neat Portland cement. Thus, the cement slurry is pumped into the non-reactive gel 71. The cement slurry may be comprised of any substance that contains any cementitious or settable material.

The pressure that is exerted by the cement slurry causes the cement slurry and the non-reactive gel 71 to squeeze out from the liner 28 into the zone of interest. The flow rate associated with squeezing of the non-reactive gel and the cement slurry is sufficient to create a turbulent flow, which causes the cement slurry, the non-reactive gel and the reactive gel to mix in the zone of interest 63. The cement and the reactive gel form a thixotropic cement gel, or thixotropic cement slurry, in the zone of interest 63 on contact.

Figure 5:
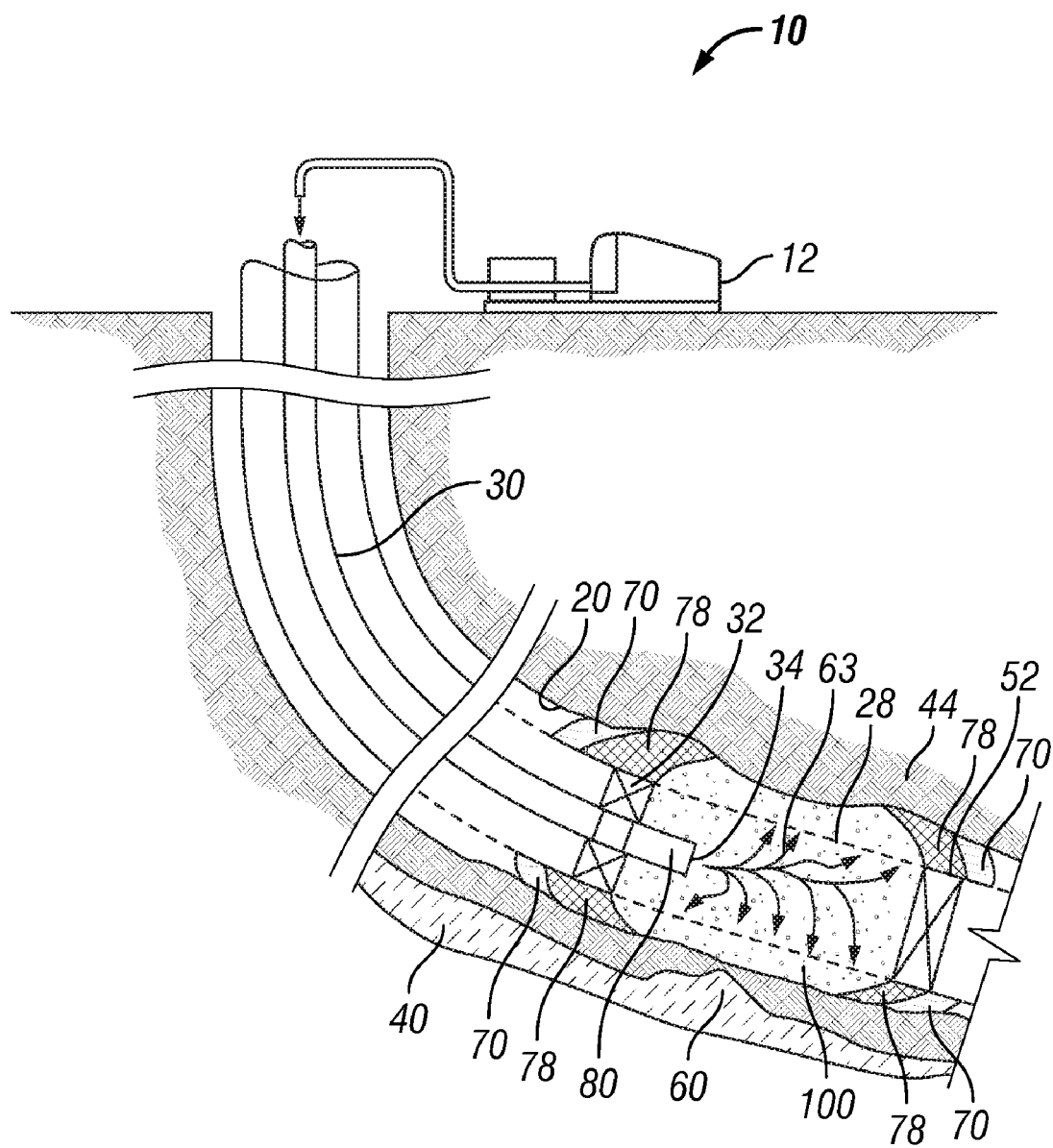

Referring to FIG. 5, the mixing of the cement and the reactive gel form a boundary layer 78, which is a thixotropic cement gel. As more cement is squeezed into the zone of interest 63, the boundary layer 78 grows in dimension along the annulus, resulting in clean cement, depicted at reference numeral 100, being placed in the zone of interest 63.

At the conclusion of the stage depicted in FIG. 5, the packer 32 may be unset, and withdrawal of the string 30 begins. A sealing means may be used to maintain the cement 100 in a clean state. This means may be, for example, a non-reactive gel that is pumped downhole through the central passageway of the string 30 and followed by a volume of reactive gel to react with this clean cement as the string 30 is withdrawn from the zone of interest. As another example, the sealing means may include a device such as a sealing packer that seals closed after the string 30 is withdrawn from the zone of interest. The latter approach results in a cement slug that sets inside the inner liner, with the cement and gel being formed in the outer annulus at the zone of interest. The inner liner may then be drilled out so that the remainder of the wellbore 20 may be accessed at a greater measured depth past the cemented zone.

Figure 6:
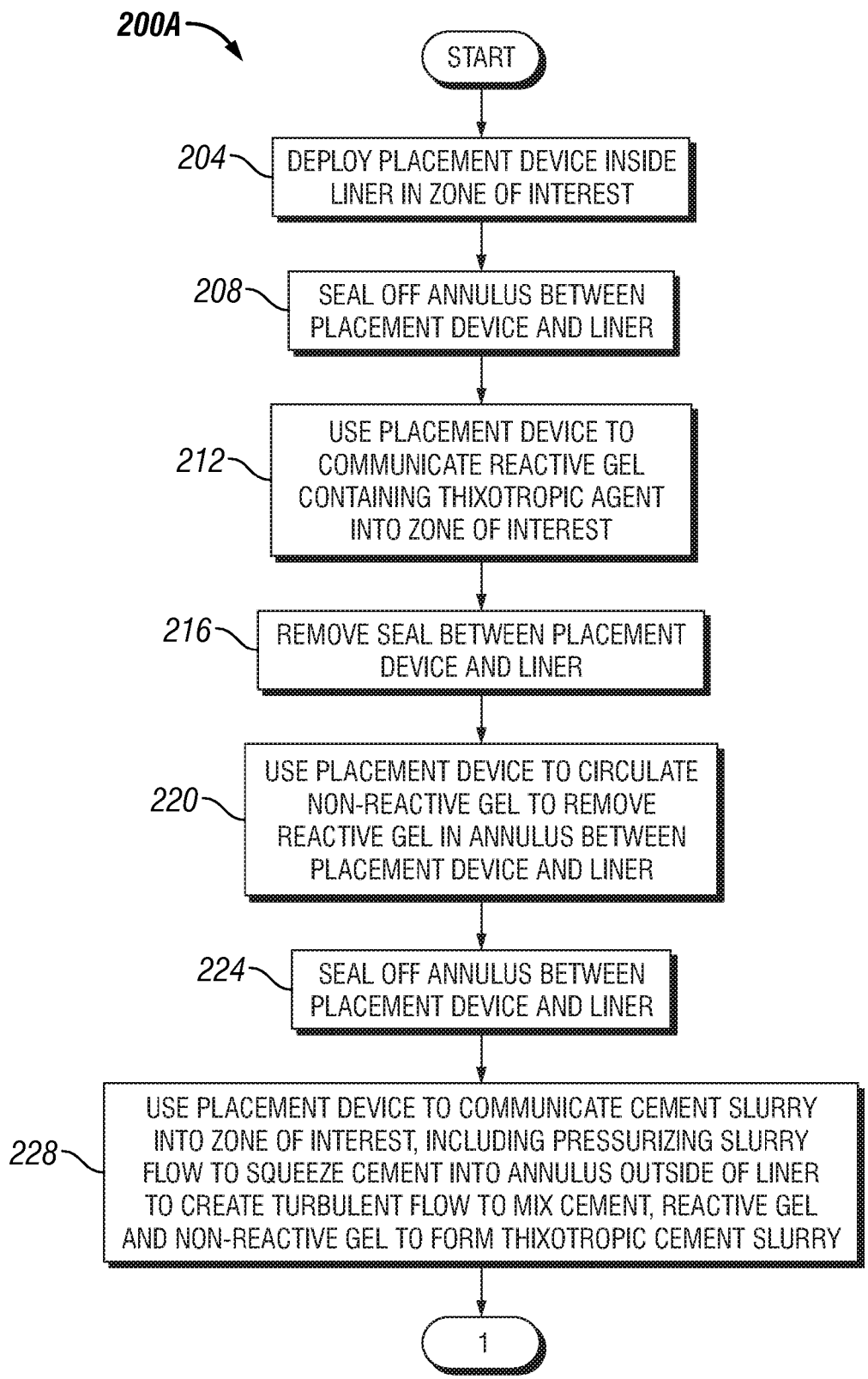
FIG. 6 is a flow diagram depicting a method to place cement in a well according to an embodiment of the invention.
Figure 7:
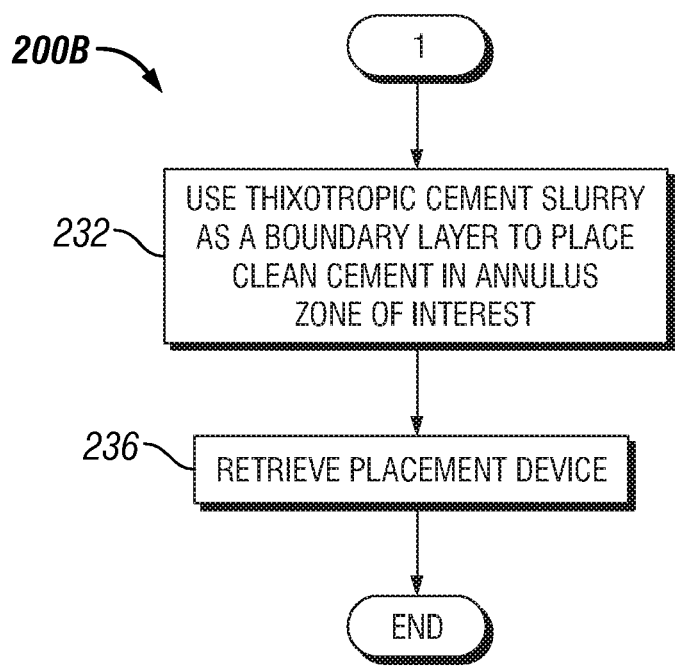
FIG. 7 is a flow diagram depicting a method to place cement in a well according to an embodiment of the invention.

Referring to FIG. 6, which depicts a first portion 200A of a method, and FIG. 7, which depicts a second portion 200B of the method, the method to cement a zone of interest in a well includes deploying (block 204) a placement device (block 204), such as coiled tubing, casing, drill pipe or liner, inside a liner in the zone of interest. It is noted that the liner may be replaced with a casing or other tubular member in other embodiments of the invention. Next, the annulus between the placement device and the liner is sealed, pursuant to block 208. The placement device is then used, pursuant to block 212, to communicate a reactive gel that contains a thixotropic agent into the zone of interest. The seal between the placement device and the liner is then removed (block 216) and the placement device is used to circulate, pursuant to block 220, a non-reactive gel to remove the reactive gel in the annulus between the placement device and the liner. Once again, a seal may be formed between the placement device and the liner, pursuant to block 224. Next, the placement device is used (block 228) to communicate a cement slurry into the zone of interest. This communication includes pressurizing the cement slurry flow to squeeze cement into the annulus outside of the liner to create a turbulent flow to the mix the cement, reactive gel and non-reactive gel to form a thixotropic cement slurry. Referring to FIG. 7, the thixotropic cement slurry is used, pursuant to block 232, as a boundary layer to place clean in the zone of interest. Next, the placement device may be retrieved from the well, pursuant to block 236.

Figure 8:
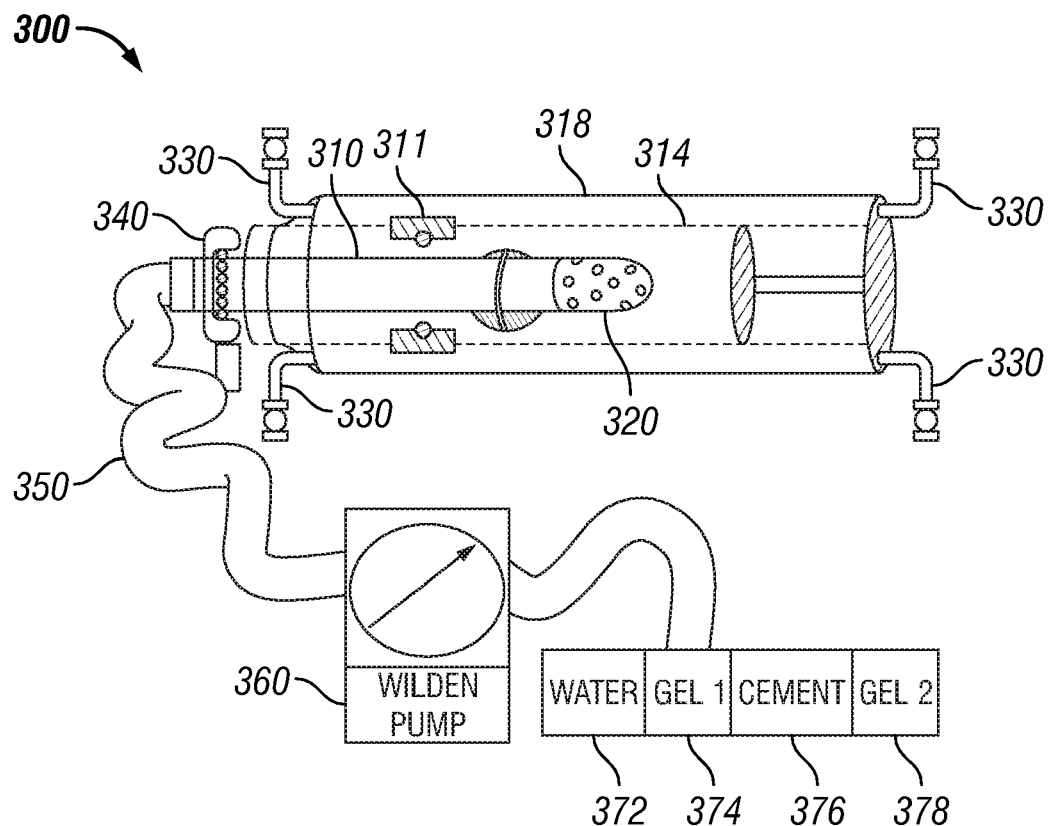
FIG. 8 is a wellbore placement simulator according to an embodiment of the invention.

Referring to FIG. 8, the dynamics of the above-described downhole mixing may be viewed using a wellbore simulator 300. In general, the wellbore simulator includes a transparent piping 318 to simulate the wellbore, an inner transparent piping 314 to simulate the liner, a coiled tubing 310 that extends inside the piping 314 and simulates the string 30. Ball valves and pipe fittings 330 are adjusted to simulate annulus pressure. Furthermore, a hose 350 may be used to connect the coiled tubing 310 to a pump 360 for purposes of delivering various materials inside the simulator, such as water 372, a gel 374 (a reactive gel, for example), a cement 376 and a gel 378 (a non-reactive gel, for example).

The simulator 300 may additionally include other features such as a linear ball bearing or block 340. A cleaning nozzle 320 may also be connected to the end of the coiled tubing 310. Additionally, a coupling seal and o-ring 311 may be used to simulate the packer 32.

In operation, the cleaning nozzle 320 may be pulled back to seal against the coupling seal and o-ring 311 to simulate the packer system downhole. A reactive gel may then be pumped through the nozzle 320 and squeezed into the annulus outside the nozzle 320. The nozzle may then be pushed forward to simulate opening of the packer and the flow path downhole. A non-reactive gel may then be pumped through the coiled tubing 310 as the nozzle 320 is reciprocated back and forth. Finally, the nozzle 320 may be pulled back into the coupling seal and o-ring 311 to simulate once again setting the downhole packer. Cement may then be squeezed into the zone of interest. The different fluids may contain coloring such as pigments or dyes to assist in viewing of the materials, boundary layer and the mixing process.

Advantageously, methods described herein may also further comprise injecting a breaker agent into the well, the breaker agent causing the gel to break down over time. Methods described herein may also further comprises preparing at the surface a reactive gel comprising the thixotropic agent and a gel component, the gel breaks down on contact with hydrocarbon bearing fluids, wherein the step of introducing the thixotropic agent comprises introducing the reactive gel into the well.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method of providing a thixotropic cement slurry to at least one zone of a wellbore in a subterranean formation penetrated by said wellbore, comprising the steps of:
   - introducing a thixotropic agent into the well through a tubular member disposed in the well;
   - subsequently cleaning out residue of the thixotropic agent from an interior passageway of the tubular member;
   - subsequently introducing a cement slurry into the well through the tubular member disposed in the well;
   - wherein said thixotropic agent and said slurry mix downhole to form a thixotropic cement slurry downhole in the wellbore.

2. The method of claim 1, wherein the step of introducing the thixotropic agent comprises preparing at the surface of the well, a reactive gel comprising a gel component and the thixotropic agent, and injecting the reactive gel into the well.

3. The method of claim 1, wherein the step of cleaning comprises introducing a non-reactive gel that does not form a thixotropic reaction with the cement slurry to circulate the residue of the thixotropic agent from the central passageway of the tubular member.

4. The method of claim 1, wherein the step of forming the thixotropic cement slurry comprises forcing the cement slurry into the thixotropic agent creating a turbulent flow to enhance the mixing.

5. The method of claim 1, wherein the step of mixing the thixotropic cement slurry downhole in the well further comprises mixing the cement slurry and the thixotropic agent with a non-reactive gel that does not form a thixotropic reaction with the cement slurry.

6. The method of claim 1, further comprising:
   preparing at the surface, a nonreactive gel comprising a gel component, and injecting the nonreactive gel into a wellbore after a reactive gel comprising the thixotropic agent has been injected in the well.

7. The method of claim 6, wherein the reactive gel, the nonreactive gel, and the cement slurry are injected into the wellbore through a tubular.

8. The method of claim 1, further comprising:
   preparing at the surface a reactive gel comprising the thixotropic agent and a gel component, the gel breaks down on contact with hydrocarbon bearing fluids, wherein the step of introducing the thixotropic agent comprises introducing the reactive gel into the well.

9. The method of claim 1, wherein the thixotropic agent is inert at the surface and becomes active at wellbore conditions to increase viscosity of the cement slurry in the wellbore.

10. The method of claim 1, wherein the thixotropic cement slurry has a reversible gelling time of from about 10 to about 60 seconds.

11. The method of claim 1, wherein the thixotropic agent comprises strongly interacting particulate or molecular species.

12. The method of claim 11, wherein the thixotropic agent comprises a fine grained inorganic colloid.

13. The method of claim 12, wherein the thixotropic agent comprises a synthetic smectite-type clay colloid.

14. The method of claim 11 wherein the thixotropic agent is selected from the group consisting of attapulgite, fumed silica, micas, montmorillonites, bentonites, organoclays, castor based thixotropes, polyamides, polethylenes, sepiolite and laponite.

* * * * *